United States Patent [19]

Rutjes et al.

[11] Patent Number: 5,653,778
[45] Date of Patent: Aug. 5, 1997

[54] MOLDING DEVICE COMPRISING MICROWAVE GENERATOR AND A MICROWAVE OVEN

[75] Inventors: Peter C. S. Rutjes; Petrus F. De Jongh, both of Eindhoven, Netherlands

[73] Assignee: U.S. Philips Corporation, New York, N.Y.

[21] Appl. No.: 621,374

[22] Filed: Mar. 25, 1996

Related U.S. Application Data

[63] Continuation of Ser. No. 408,452, Mar. 22, 1995, abandoned, which is a continuation of Ser. No. 151,079, Nov. 12, 1993, abandoned, which is a division of Ser. No. 987,517, Dec. 8, 1992, Pat. No. 5,324,345.

[30] Foreign Application Priority Data

Dec. 9, 1991 [EP] European Pat. Off. ............ 91203206

[51] Int. Cl.$^6$ ........................................ C03B 11/00
[52] U.S. Cl. ................... 65/64; 65/102; 65/286; 425/174.8 R; 264/432; 219/696; 219/709
[58] Field of Search .................. 65/102, 64, 286, 65/82; 264/25, 432; 425/174.8 R; 219/696, 707, 709

[56] References Cited

U.S. PATENT DOCUMENTS

| | | | |
|---|---|---|---|
| 3,429,359 | 2/1969 | Hollingsworth | 264/25 |
| 3,732,048 | 5/1973 | Guergs | 264/25 |
| 4,304,744 | 12/1981 | Stroud | 264/25 |
| 4,568,262 | 2/1986 | Feurer | 264/29 |
| 4,757,171 | 7/1988 | Palaith | 264/25 |
| 4,771,153 | 9/1988 | Fukushima | 264/25 |
| 4,822,397 | 4/1989 | Crossley | 65/107 |
| 4,880,578 | 11/1989 | Holcombe | 264/25 |
| 4,968,726 | 11/1990 | Thorsrud | 264/25 |
| 4,969,944 | 11/1990 | Maechal | 65/104 |
| 5,365,042 | 11/1994 | Benoit | 264/432 |

OTHER PUBLICATIONS

The Random House Dictionary of the English Language, Stein, 1967, p. 1049.

*Primary Examiner*—John Hoffmann
*Attorney, Agent, or Firm*—Ernestine C. Bartlett

[57] ABSTRACT

A device for molding products made of glass or a synthetic resin which device has a microwave generator, a microwave oven coupled to the generator and mold parts movable relative to each other provided in the microwave oven for forming molds for holding a parison of the glass or synthetic resin to be heated dielectrically.

3 Claims, 3 Drawing Sheets

MOLDING DEVICE COMPRISING MICROWAVE GENERATOR AND A MICROWAVE OVEN

This is a continuation of application Ser. No. 08/408,452, filed Mar. 22, 1995, Abandoned which is a continuation of application Ser. No. 08/151,079, filed Nov. 12, 1993, Abandoned, which is a divisional of application Ser. No. 07/987,517, filed on Dec. 8, 1992, now U.S. Pat. No. 5,324,345.

FIELD OF THE INVENTION

The invention relates to a method of moulding products whereby a parison of material is brought into a mould arranged in an oven, is heated up in the oven to a predetermined temperature at which at least a portion of the parison has a desired viscosity, and is then moulded into a desired product shape by means of at least one further mould.

The invention further relates to a device suitable for carrying out the method according to the invention.

The method and device are particularly suitable for manufacturing optical products such as lenses, prisms, gratings, etc. The material from which these products are manufactured is glass or a thermoplastic synthetic resin such as, for example, PMMA (PolyMethyl MethAcrylate) or PC (PolyCarbonate).

BACKGROUND OF THE INVENTION

In a method known from Japanese Patent 62-59539, a glass parison is heated in an oven by thermal radiation energy until a portion of the glass parison has a desired viscosity. The glass is then moulded into the desired shape. The thermal radiation energy is derived from a halogen lamp.

A disadvantage of this known method is that the time which elapses before a portion of the glass parison has the desired viscosity is comparatively long. Moreover, the radiation energy also heats the mould. The mould will expand as a result and assume a different shape. The dimensions of products manufactured with these moulds are accordingly dependent on the shape of the moulds at the increased temperature which is indeed insufficiently controllable.

In the case of precision moulding of optical products, for example lenses for use in LCD players, high requirements are imposed on the dimensions of the moulded lenses, and it is undesirable for the dimensions of the lenses to be determined by the dimensions of the moulds at the said insufficiently controllable temperature.

SUMMARY OF THE INVENTION

The invention has for its object to provide a method whereby the required heating-up time is comparatively short, so that the dimensions of the moulds remain substantially unchanged during moulding.

This object is achieved according to the invention in that the parison of material is heated up to the desired temperature by means of dielectric heating. Dielectric heating is often understood to mean heating by means of microwaves having a frequency higher than 500 MHz. Depending on the kind of material from which the moulds are manufactured, the moulds will or will not be heated dielectrically. When the mould is made of metal, the mould is not heated by the alternating electric field. However, the mould will be heated through radiation and conduction from the glass parison. Owing to the short heating-up time of the parison, however, this heat transfer is of minor influence. The dimensions of the moulds remain substantially unchanged during heating of the parison. Another advantage is that the parison is given a comparatively high temperature during the comparatively short heating-up time, so that the required moulding pressure is small.

An embodiment of the method according to the invention is characterized in that an electric field is generated in the oven by means of microwave power, with which field the parison is heated dielectrically, the frequency of a microwave generator generating the microwave power corresponding to the resonance frequency of the oven, while the frequencies are mutually attuned during heating of the parison. The resonance frequency of the oven changes owing to the heating of the parison. A maximum energy transfer is obtained in that the resonance frequency of the oven and the frequency of the microwave generator are continually attuned, and the time necessary for heating up the parison is a minimum.

Another embodiment of the method according to the invention is characterized in that the frequency of the microwave generator is adapted to the resonance frequency of the oven. This can be achieved by means of an electronic circuit by which the frequency is adapted over a wide frequency range. An inexpensive and simple method which, however, is limited to a narrow frequency range is characterized in that a portion of the microwave power is reflected by the oven and is sent to the microwave generator through a phase angle rotator, so that the frequency of the microwave generator becomes substantially equal to the resonance frequency of the oven.

A yet further embodiment of the method according to the invention is characterized in that the resonance frequency of the oven is adapted to the frequency of the microwave generator through displacement in the oven of a dielectric element having low dielectric losses. The dielectric losses in a material are determined by the dielectric constant and the dielectric loss factor of the material. This method is suitable when a microwave generator is used whose frequency is unchangeable.

Another embodiment of the method according to the invention is characterized in that the parison is preheated to a temperature which is higher than the transformation temperature of the material of the parison before the parison is put in the mould.

The "transformation temperature" is defined for a glass as that temperature at which the glass has a viscosity of $10^{13.2}$ Poise, and for synthetic resin as the transition temperature from the glass phase to the rubber phase.

The parison may be preheated up to the transformation temperature outside the oven by known heating techniques, for example, by means of infrared. Dielectric heating of glass and synthetic resin from room temperature up to the transformation temperature takes more time per degree of temperature increase than it does for one degree of temperature increase of the glass or synthetic resin from the transformation temperature upwards, because the dielectric constant and loss factor (see the description of the Figures below) are higher at a higher temperature. The glass or synthetic resin parison can be well manipulated up to the transformation temperature and can be put in the mould without extreme deformations at this temperature. Owing to preheating of the parison, the time during which a parison lies in the mould is further decreased and a more efficient use of the oven is obtained.

A further embodiment of the method according to the invention is characterized in that the moulds are preheated to a temperature which is substantially equal to the temperature of the parison which is put in the mould. As a result, the parison put on the mould does not cool down. Preferably, the moulds are preheated to a temperature of approximately ten degrees above the transformation temperature. Since the parison and the moulds are heated by different heating techniques, a good temperature control is possible.

Another embodiment of the method according to the invention is characterized in that the parison is heated up to a temperature at which at least a portion of the parison has a viscosity of between $10^8$ and $10^6$ Poise. A good deformation of the parison into the desired product is possible at this viscosity.

Yet another embodiment of the method according to the invention is characterized in that the dielectric heating is carried out in an alternating electric field having a frequency of between 2400 and 2500 MHz. This frequency can be readily realised with commercially available microwave generators.

The invention further relates to a device suitable for carrying out the method according to the invention, which device is provided with at least two moulds which are movable relative to one another and which are arranged in an oven. The device according to the invention is further provided with a microwave generator and a microwave resonator, the oven being the microwave resonator. The device is compact and of a simple construction owing to the integration of the moulds and the microwave resonator.

It is noted that dielectric heating of glass is known per se from French Patent 2288958. In that case, however, the glass is not moulded, so that problems with keeping the mould dimensions unchanged are not applicable.

An embodiment of the device according to the invention is characterized in that the device is provided with a circulator which is coupled to the microwave generator through a first gate, to the oven through a second gate, and to a phase angle rotator an adjustable reflection element through a third gate, which rotator influences the phase of a microwave signal which is reflected by the oven to the microwave generator and which contains the microwave power.

The phase of the microwave signal reflected by the oven is so changed by the phase angle rotator that the influence of the reflected microwave signal on the frequency of the microwave generator is a maximum.

BRIEF DESCRIPTION OF THE DRAWINGS

The invention will be explained in more detail with reference to the drawing in which.

DETAILED DESCRIPTION OF PREFERRED EMBODIMENTS

Figure 1:
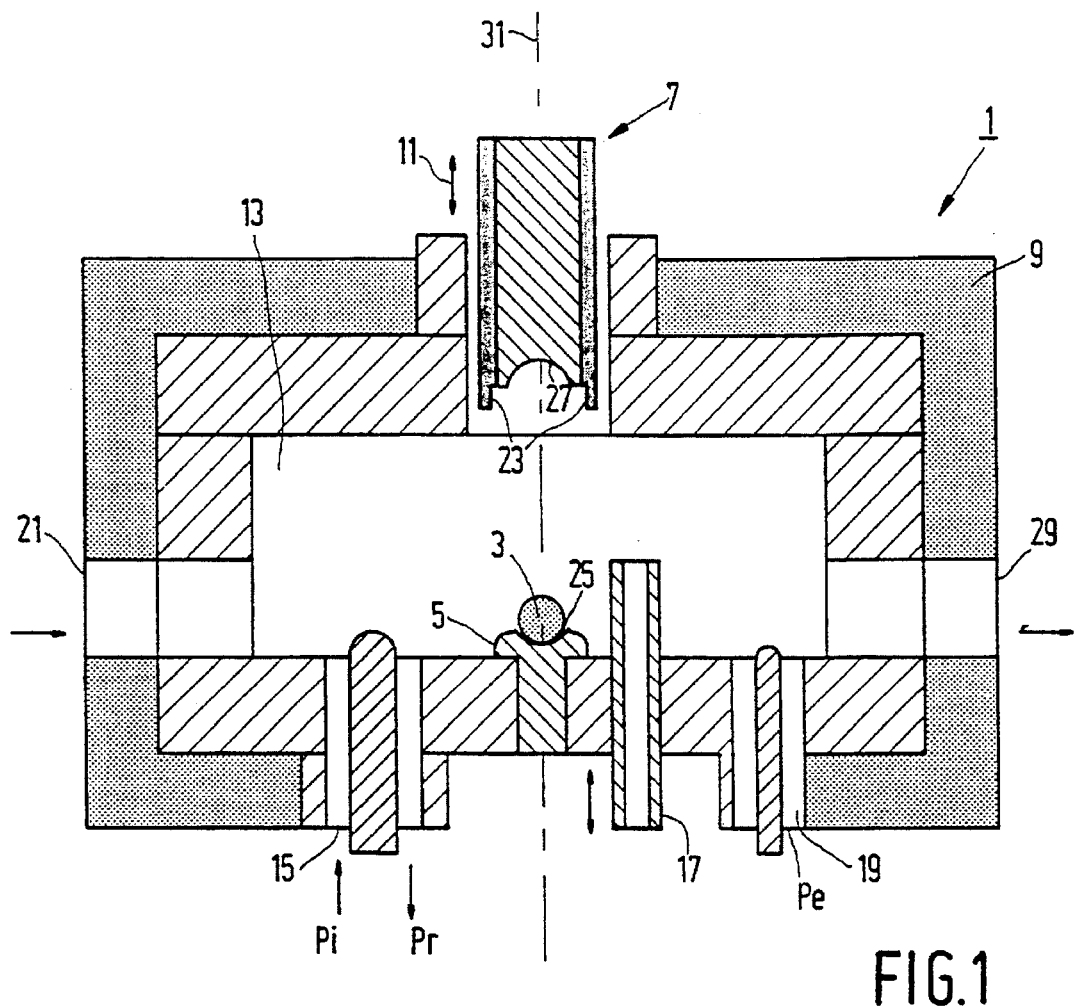
FIGS. 1 and 2 show a a diagrammatical sectional view of a first device according to the invention.
Figure 2:
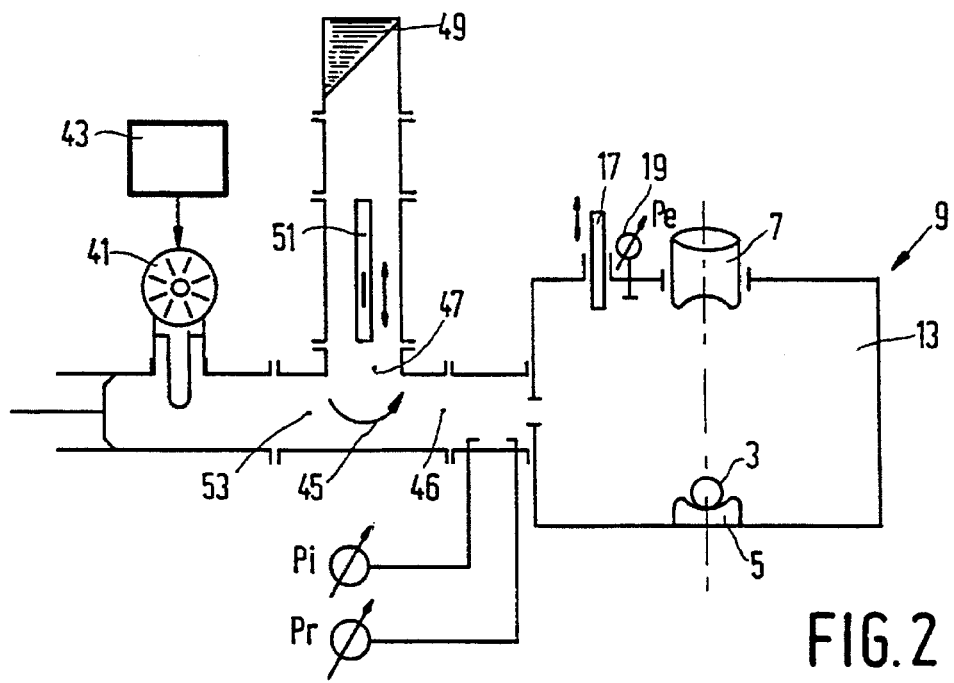

FIGS. 1 and 2 show a device 1 suitable for moulding a parison of material 3, such as glass or thermoplastic synthetic resin. In fact, the parison of material may consist of any material which can be dielectrically heated and which can be deformed as a result. The device 1 comprises two moulds 5, 7 of which the stationary mould 5 is fastened to the bottom of an oven 9 and the mould 7 is provided in an upper wall of the oven 9 and is movable in the direction of arrow 11. The device further comprises a microwave generator 41. The oven 9 encloses a resonance cavity 13 (microwave resonator) in which an alternating electric field corresponding to a microwave power $P_i$ is generated through an opening 15. A portion of the microwave power is reflected by the resonance cavity 13 and leaves the resonance cavity 13 through the opening 15. This reflected power is referenced $P_r$. The electric field present in the resonance cavity is measured through an opening 19 so as to be able to attune the resonance cavity 13 to the frequency of the microwave generator. A suitable microwave generator is, for example, a magnetron tube from a microwave oven for domestic use. The first time a parison is heated, the resonance frequency of the resonance cavity 13 must be attuned to the frequency of the microwave generator 41. For this purpose, a parison 3 is moved through a feed opening 21 onto the mould 5 by means of a gripper, for example a pair of tweezers, and an alternating electric field is then generated in the resonance cavity 13. The alternating electric field in the resonance cavity 13 is subsequently measured by means of a signal $P_c$ and a pipe 17 is moved to and fro in the resonance cavity 13 until a position of the pipe 17 is found at which the amplitude of the signal $P_c$ is a maximum. The resonance cavity is attuned to the frequency of the microwave generator with the pipe 17 in this position. The pipe 17 is made of a material which has low dielectric losses, for example, aluminium oxide. The parison 3 is heated up to a desired temperature in the alternating electric field through dipole losses (see: Dubbel, Taschenbuch für den Machinenbau, $15^{th}$ impression, pp. 1236–1237). The resonance frequency of the resonance cavity 13 changes continually owing to the presence of the glass parison 3 in the resonance cavity and the rising temperature of the parison. The frequency of the alternating electric field is periodically adapted to the changing resonance frequency of the resonance cavity 13 so as to maintain an optimal energy transfer. This is explained in more detail with reference to FIG. 2. The alternating electric field is switched off when the glass parison 3 has the desired temperature. The temperature may be measured by means of an infrared temperature gauge. It is alternatively possible to determine empirically a certain heating-up time during which the parison is to be heated. After the alternating electric field has been switched off, the mould 7 is moved towards the mould 5. A rim 23 of the mould 7 fits around the outside of the mould 5 and ensures the alignment of the mould 7 relative to the mould 5. The mould 7 presses the glass parison 3 into the shape determined by the curved mould surfaces 25 and 27 with a predetermined force. "Closed-mould" pressing takes place. This means that the volume of the parison 3 is equal to the volume of the product to be shaped, and that the shape of the product is determined by the space between the mould surfaces 25 and 27 and the rim 23 which is entirely filled with glass or synthetic resin. After it has cooled down sufficiently, the moulded product is removed from the resonance cavity 13 through a delivery opening 29 by means of a gripper.

To speed up the process, the moulds 5 and 7 and the oven walls are preheated relative to room temperature by means of heater elements (not shown) provided in the walls up to a certain initial temperature $T_b$ which is substantially equal to the initial temperature to which the glass parison 3 is brought in the resonance cavity 13. A temperature approximately ten degrees higher than the transformation temperature of the glass or synthetic resin to be moulded is taken as the initial temperature $T_L$. This is a temperature at which the glass parison 3 can still be readily manipulated. The dielectric constant $\epsilon_r$ and the loss factor $\tan\delta$ of glass and synthetic resin increase with increasing temperature. At a higher glass temperature, accordingly, less time is required for having the temperature of the parison 3 rise by one Kelvin unit than at room temperature. The power $P_D$ absorbed per unit volume of the parison is given by:

$$P_D = 2\pi \cdot f \cdot \epsilon_0 \cdot \epsilon_r \cdot \tan\delta \cdot E^2$$

In which f=frequency in Hz of the alternating electric field,
$\epsilon_0$=dielectric constant of vacuum,
E=electric field strength of the alternating electric field.

To increase the absorbed power $P_D$, a higher frequency of the alternating electric field must be used and the electric field strength at the area of the parison 3 must be optimal.

The frequency of commercially available magnetron tubes lies between 2400 and 2500 MHz, travelling-wave tubes have higher frequencies. If a travelling-wave tube is used, a greater energy dissipation is obtained in a similar glass parison at the same field strength compared with magnetron tubes. The maximum admissible electric field strength is determined by the breakdown field strength.

The resonance cavity 13 is circular-cylindrical and resonates in the "TM010 mode". The electric field lines in this case are directed parallel to the centerline 31 of the resonance cavity with the maximum value of the electric field strength on the centerline 31 of the resonance cavity 13. The magnetic field lines form concentric circles around the centreline 31 of the resonance cavity. The moulds 5, 7 and the glass parison 3 are on the centerline 31 of the resonance cavity 13. Example: a glass ball with a diameter of 4 mm is heated to a temperature of 450° C. and deposited on the mould 5 which has approximately the same temperature. The glass parison 3 is heated up to 640° C. in 5 seconds in an alternating electric field with a frequency of 2450 MHz and a maximum field strength of 10000 V/cm. The parison 3 is then moulded into a bi-aspherical lens. To restrict the heat transfer from the glass parison 3 to the moulds to a minimum, a spherical initial shape was chosen so that the initially contact surface is limited. A glass ball is simple to manufacture and therefore comparatively inexpensive.

The volume of glass or synthetic resin to be heated is always the same in the case of closed-mould pressing of a series of identical products, so that heating-up takes place in substantially the same manner for each parison. The accuracy of this volume determines the accuracy of the product dimensions. It is alternatively possible, however, to take a volume of material which is greater than the volume of the product to be moulded, and then to move the moulds 5 and 7 to a predetermined distance from one another. The excess material must then be discharged along the edges of the moulds 5 and 7. The shape of the lens, especially the accuracy of the dimensions of the lens measured in the direction of the centerline 31, is here determined by the accuracy with which the moulds 5 and 7 can be brought to and kept at the said predetermined distance.

FIG. 2 diagrammatically shows the complete device 1. The microwave generator 41 is connected to a high-voltage supply 43 and generates a microwave power $P_r$ which is guided into the resonance cavity 13 through a first and a second gate 53, 46 of a circulator 45. The resonance cavity 13 reflects a portion $P_i$ of the power $P_r$. The circulator 45 guides this reflected power into a third gate 47 of the circulator in which a portion of the power is absorbed by a water load 49 and another portion is reflected by an adjustable reflection element 51 (phase angle rotator) into the first gate 53 of the circulator 45. This power is detected by the microwave generator 41 as a load and the frequency of the microwave generator 41 changes as a result at a phase of a microwave signal containing the microwave power and set by means of the reflection element. The changing frequency of the microwave generator approximates the resonance frequency of the microwave resonator 13, so that a higher energy transfer to the parison 3 is realised in the resonance cavity 13. The energy transfer by means of microwave signals has its maximum when the resonance frequency of the resonance cavity (microwave resonator) is equal to the frequency of the microwave generator. The position of the reflection element 51 is adjustable so as to control the phase of the reflected microwave signal containing the microwave power, so that the influence of the reflected power on the frequency of the microwave generator is a maximum. The position of the reflection element is set once. Coarse tuning of the resonance frequency of the resonance cavity or resonator 13 to the frequency of the microwave generator 41 is effected with the pipe 17. Fine tuning of the frequency of the microwave generator 41 to the resonance frequency of the resonance cavity 13 takes place through the reflection element 51.

Figure 3:
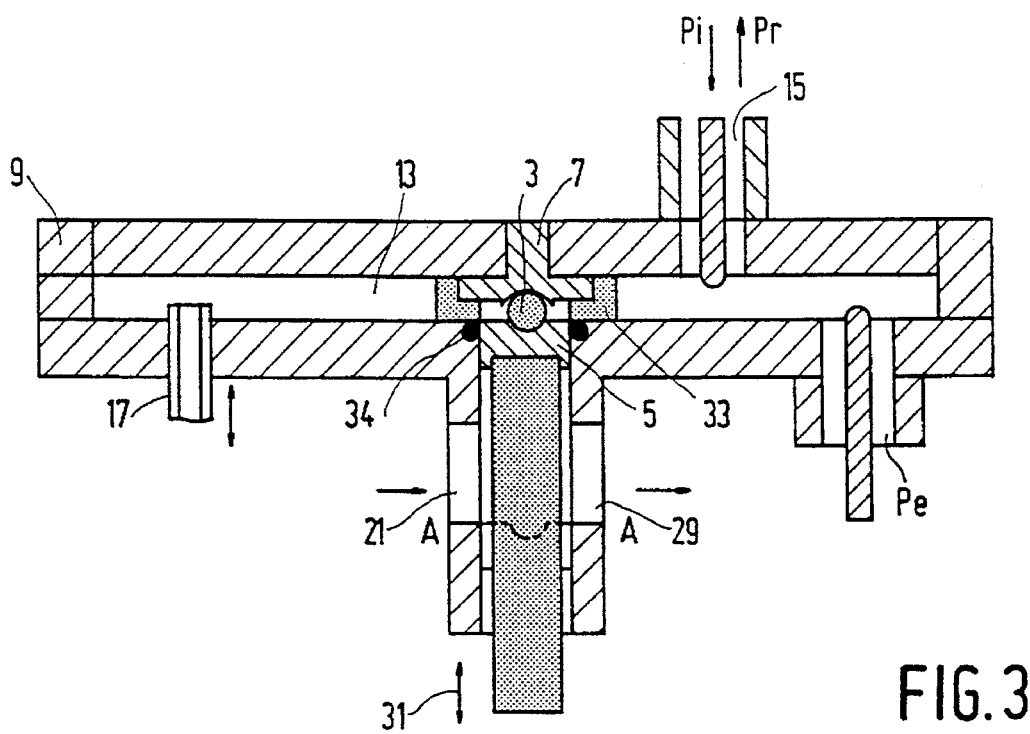
FIG. 3 shows a a diagrammatical sectional view of a second device according to the invention.

FIG. 3 shows an alternative device according to the invention for moulding a glass parison 3. Parts corresponding to those in FIG. 1 have been given the same reference numerals. Supply and delivery of the glass parisons takes place in a different way in this device 2 compared with device 1. The mould 7 is fixedly connected to the oven 9, and the mould 5 is movable in the direction of arrow 31. When the mould 5 is in the position indicated with a broken line at A—A, the parison 3 is put on the mould 5 through the feed opening 21. The mould 5 is then moved towards the mould 7 until the parison 3 is positioned between the two moulds 5 and 7. An alternating electric field is generated in the resonance cavity 13 through the opening 15 until a desired temperature is reached. Then the parison is moulded into the desired shape in that the mould 5 is moved farther towards the mould 7. During shaping, power may be transmitted to the parison in that a bush 33, which serves to guide the mould 5, is made of a material which is transparent to microwaves, for example, ceramic material. A resilient ring 34 ensures that there is always an electrically conducting contact present between the wall of the resonance cavity 13 and the mould 5. This is important for correct functioning of the resonance cavity 13.

Figure 4:
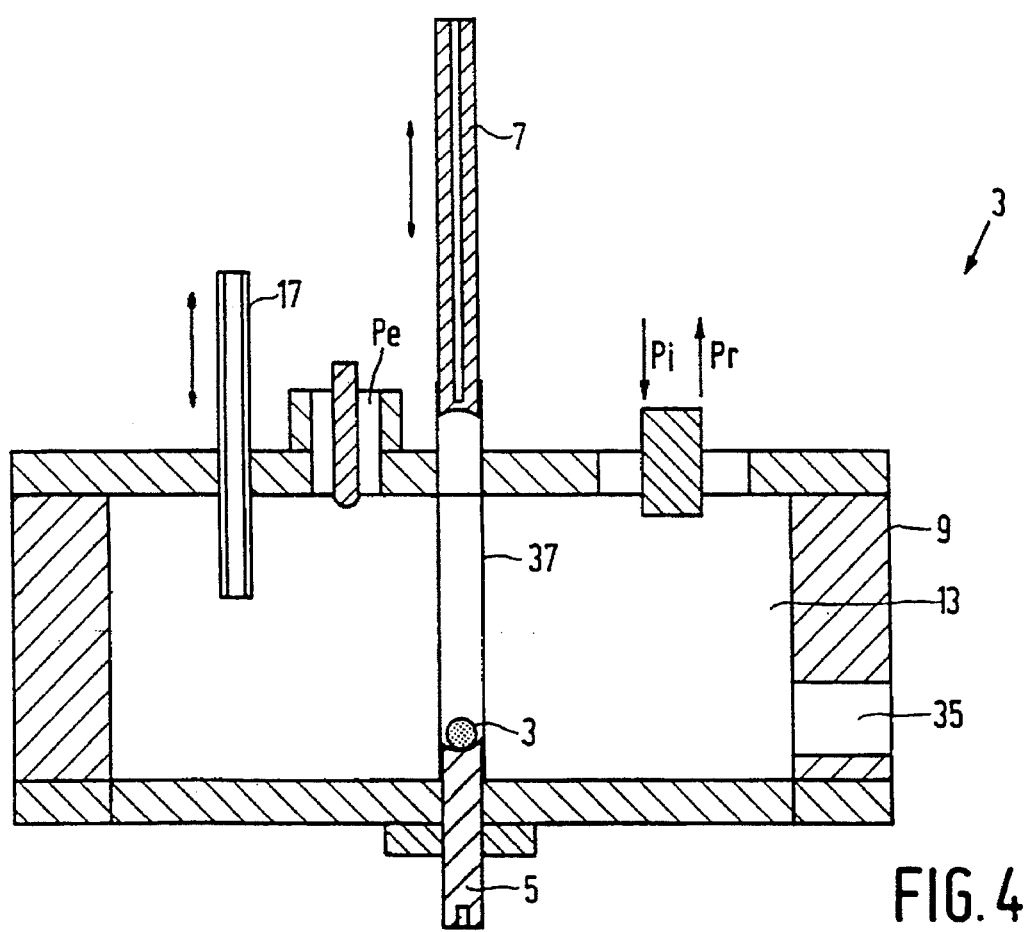
FIG. 4 shows a a diagrammatical sectional view of a third device according to the invention.

FIG. 4 shows yet another device according to the invention for moulding a glass parison 3. Parts corresponding to those in FIG. 1 have been given the same reference numerals. Supply and delivery of the parisons take place through an opening 35 in the wall of the oven 9. The mould 7 is guided into the oven 9 through a tube 37 of a material which has low dielectric losses, for example, aluminium oxide, which tube is arranged around the mould 5. A simple guiding of the mould 7 is realized in this way.

Figure 5:
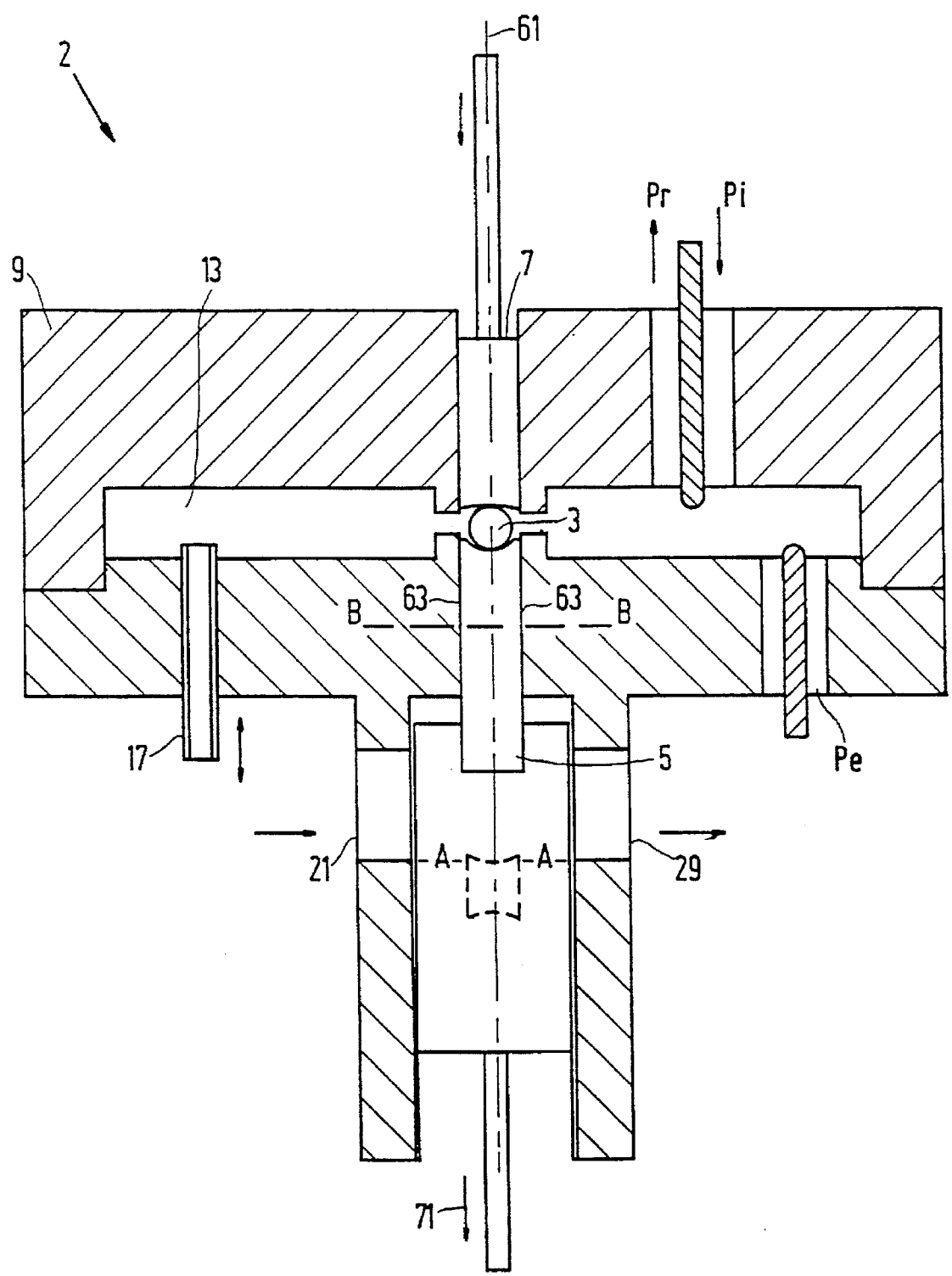
FIG. 5 shows a sectional view of a fourth device according to the invention.

FIG. 5 shows a yet further device according to the invention for moulding a glass parison 3. Parts corresponding to those in FIG. 1 have been given the same reference numerals. Supply and delivery of the glass parisons in this device take place in the same manner as in the device according to FIG. 3. The moulds 5 and 7 are displaceable towards and away from one another along the centreline 61. When the mould 5 is in the position shown with broken lines at A—A, the parison 3 is laid on the mould 5 through the feed opening 21. The mould 7 is then in the initial position shown in FIG. 5. The mould 5 is subsequently moved in the direction of the mould 7 until the parison 3 is positioned between the two moulds 5 and 7. An alternating electric field is generated in the resonance cavity 13 through the opening 15 until a desired temperature is reached. Then the alternating electric field is switched off and the moulds 5 and 7 are together moved in the direction of arrow 71. At the level of the line B—B, the mould 5 is stopped while the mould 7 travels further in the direction of the arrow 71 and the parison is moulded into the desired shape, the walls 63 of the oven being used as a boundary for the product to be moulded in radial direction. After moulding, the two moulds 5 and 7 are displaced over a small distance in the direction of the arrow 71 so that the moulded product is disengaged from the walls 63. After that, the mould 7 is moved into the starting position again and the mould 5 is brought into the position indicated with A—A, where the moulded product is discharged through the delivery opening.

We claim:

1. A device suitable for carrying out a method of molding products by heating a parison of material dielectrically, said device comprising a microwave resonant oven, a microwave generator coupled to said oven for generating a microwave signal, an accompanying electric field, and resultant microwave power, a portion of said microwave signal being reflected by said oven back to said microwave generator, a stationary mold attached to an inner portion of said oven, a movable mold, movable relative to said stationary mold and positioned in an additional inner portion of said oven, means extending through said oven, for guiding said parison into said stationary mold, means for moving said movable mold into contact with said stationary mold to thereby surround said parison while said parison is heated by said electric field, means for measuring said electric field, said measuring means being provided in said oven through an opening in said oven and means, positioned within said oven for attuning the frequency of said oven to the frequency of said microwave generator while said parison is surrounded by said molds.

2. A device as claimed in claim 1 wherein the frequency of the microwave generator generating the microwave signal is the same or a multiple of the resonance frequency of the oven, while the frequencies are mutually attuned during heating of said parison.

3. A device as claimed in claim 1, wherein the movable mold is guided into the oven through a tube, which tube is arranged around the stationary mold.

* * * * *